United States Patent
Cline et al.

[11] Patent Number: 6,060,411
[45] Date of Patent: May 9, 2000

[54] LOW OBSERVABLE WEAPON KIT

[75] Inventors: Duane M. Cline, Lomita; Bobby T. Harless, Gardena; Kenneth J. Kaplin, North Hollywood; In S. Kim, Fullerton; Michael B. Laurent, Cypress; Jonathan Mersel, Los Angeles; Thomas Ruskowski, Redondo Beach, all of Calif.

[73] Assignee: Northrop Grumman Corporation, Los Angeles, Calif.

[21] Appl. No.: 08/947,248

[22] Filed: Oct. 8, 1997

[51] Int. Cl.⁷ .................................................... B32B 5/02
[52] U.S. Cl. .......................... 442/132; 102/293; 342/5; 342/10
[58] Field of Search ................... 442/110, 132, 442/230, 231, 232; 342/5, 10; 102/293

[56] References Cited

U.S. PATENT DOCUMENTS

| | | | |
|---|---|---|---|
| 2,366,374 | 1/1945 | Whitesell, Jr. | 102/2 |
| 3,555,550 | 1/1971 | Walters | 343/18 |
| 3,671,965 | 6/1972 | Rabenhorst et al. | 343/18 C |
| 3,997,899 | 12/1976 | Rolsma | 343/18 |
| 4,249,687 | 2/1981 | Warnier | 224/913 |
| 4,314,682 | 2/1982 | Barnett et al. | 244/158 |
| 4,323,012 | 4/1982 | Driver, Jr. | 102/489 |
| 4,444,117 | 4/1984 | Mitchell, Jr. | 102/489 |
| 4,725,490 | 2/1988 | Goldberg | 428/292 |
| 4,947,274 | 8/1990 | Lehman et al. | 342/3 |
| 5,158,509 | 10/1992 | Ebaugh et al. | 244/3.24 |
| 5,173,699 | 12/1992 | Barr et al. | 342/2 |
| 5,223,667 | 6/1993 | Anderson | 102/517 |

Primary Examiner—Harold J. Tudor
Attorney, Agent, or Firm—Terry J. Anderson; Karl J. Hoch, Jr.

[57] ABSTRACT

In accordance with the present invention, a store covering for reducing the radar observability of an externally mounted store is provided with a non-rigid body covering. The body covering is provided with a radar reflective material. The body covering is formed to fit around a portion of the externally mounted store. The body covering is in slidable engagement and disengagement about at least a portion of the externally mounted store to allow repeated installation and removal.

34 Claims, 1 Drawing Sheet

LOW OBSERVABLE WEAPON KIT

FIELD OF THE INVENTION

The present invention relates generally to an apparatus for reducing radar observability, and more particularly to an apparatus for reducing the radar observability of an externally mounted store.

BACKGROUND OF THE INVENTION

Military aircraft utilize air-to-surface and air-to-air weapons to attack enemy targets. In the case of air-to-surface ballistic weapons, these typically consist of bombs, dispensers and missiles. These weapons tend to be large, approximately 8 to 15 feet long, and heavy, between 500 and 2500 pounds. Their size and weight can be determinative of aircraft design. For small aircraft, internal carriage of large numbers of these weapons is impractical. These aircraft normally carry their weapons or stores externally on hardpoints located on the wings or fuselage.

Generally, these weapons are designed for good aerodynamic characteristics when externally carried. The design considerations of many of these weapons, however, did not emphasize the reduction of the weapon radar signature or observability, as defined by the radar-cross-section of the weapon. For example, the radar-cross-section of these weapons can exceed the levels of the latest generation of fighter/attack aircraft (e.g., F-117, F-22, and JSF) and modified modern fighter/attack aircraft (e.g., F-14, F-16, and F/A-18E/F).

In addition to the surface texture and material of these weapons, other elements of these weapons increase the radar-cross-section. For example, many of these weapons are characterized by a nose tip or nose plug which is adapted to receive a large wrench in order to screw off the nose tip of the weapon to gain access to the interior payload. Due to this wrenching, sharp angles and flat surfaces are located at the nose tip which increase the radar-cross-section. In addition, these weapons typically have rear fins, which may be movable for aerodynamic control. These fin edges greatly increase the radar-cross-section of the weapon.

Accordingly, the carriage of these weapons significantly increases the overall radar-cross-section of the aircraft, and, therefore, the observability of the aircraft. Typically, aircraft radar observability impacts the mission success rate and survivability.

Large numbers of these weapons are currently held in inventory. While utilization of these weapons with their poor radar observability characteristics is undesirable, retrofitting or modifying these weapons is a desirable option.

In addition to weapons, air vehicles may be required to externally carry other stores. These include, but are not limited to, fuel stores, sensor suites, communications stores (e.g., data link electronics, antenna, and the like), targeting pods, bivets, and counter-measures stores (e.g., chaff, flares, and the like). These other stores are subject to the same undesirable radar-cross-section characteristics as the above-described weapons.

Prior attempts to modify the radar-cross-section of these stores include the application of radar absorptive coatings or material. This approach is expensive, not only in terms of initial coating application costs, but costs due to inspection and maintenance in controlled conditions and associated extensive training.

Other approaches to reducing the radar-cross-section of externally mounted stores include significant alterations to the external shape of the store. Radar observability is a function of the radar signal which is reflected back to a radar detecting sensor which is usually located concurrent with the radar signal source (i.e., back scatter). The external shape of the store directly impacts the radar signal which is reflected back to the radar detecting sensor. Thus, the objective of shape alterations is to reflect a radar signal to desired direction (i.e., away from the radar detecting sensor which is usually located concurrent with the radar signal source). This approach is undesirable, however, due to the drastic change in the shape of the store. Significant alteration in the shape of a store, such as a weapon, triggers the Governmental requirement for a flight re-certification program for both the weapon and the aircraft. Such re-certification programs are undesirable due to cost limitations. Another approach used to reduce radar-cross-section of externally carried stores is to encase them in a pod, shell or shroud. These solutions have proven to be undesirable due to the weight and mechanical complexity associated with a pod which is permanently affixed to a wing or fuselage.

Additionally, launched stores, such as ballistic weapons, often employ aerodynamic control surfaces which are used to provide a desired flight performance characteristic. These aerodynamic control surfaces include strakes and wings. Radar-cross-section reduction approaches which utilize rigid pods or shells are additionally undesirable due to the potential interference with these aerodynamic control surfaces.

Accordingly, there is a need in the art for a system which is able to achieve the reduction of externally mounted store radar observability, is relatively low cost, does not interfere with the utilization of aerodynamic control surfaces mounted on the store, and does not significantly alter the shape of the store and aircraft, thereby requiring governmental fight re-certification.

SUMMARY OF THE INVENTION

In accordance with the present invention, a store covering for reducing the radar observability of an externally mounted store is provided with a non-rigid body covering. The body covering is provided with a radar reflective material. The body covering is formed to fit around a portion of the externally mounted store. The body covering is in slidable engagement and disengagement about at least a portion of the externally mounted store to allow repeated installation and removal.

The radar reflective material facilitates reflection of radar signals in a desired direction (i.e., away from the radar detecting sensor which is usually located concurrent with the radar signal source).

In addition, at least a portion of the body covering is conductive and the conductivity is less than 2 Ohms per square inch. The radar reflectiveness may be indirectly measured by the conductivity of the body covering because the radar reflectiveness increases with a corresponding increase of material conductivity.

In addition, the body covering is provided with a fabric material. Further, at least a portion of the fabric material is embedded with a conductive material. It is preferred that the conductivity is less than 2 Ohms per square inch. Further still, the conductive material is a metallic material. Additionally, at least a portion of the fabric material itself comprises a conductive material. It is preferred that the conductivity is less than 2 Ohms per square inch. Further still, the conductive material is a metallic material. The body covering may be formed to closely fit to the externally mounted store. It is contemplated that at least one fastener is in contact with the body covering and when the fastener is secured, at least a portion of the body covering is held in close contact with the externally mounted store.

In addition, the store covering of the present invention may be utilized with an externally mounted store having at least one rear fin. The store covering is further provided with at least one fin receiving cover. The fin receiving cover is provided with a radar reflective material. The radar reflective material facilitates reflection of radar signals in a desired direction (i.e., away from the radar detecting sensor which is usually located concurrent with the radar signal source). Each respective fin receiving cover is formed to substantially conform to the shape of at least a portion of a respective rear fin for receiving the respective rear fin. Furthermore, wherein the rear fin of the externally mounted store is adapted to move for aerodynamic control, each respective fin receiving cover is detachable from a respective rear fin in response to rear fin movement. Thus, it is contemplated that the rear fin receiving cover would mitigate radar observability prior to and while the externally mounted store is launched. Subsequent to launching, when the rear fin may move for aerodynamic control during flight, movement would initiate the detachment or jettisoning of the fin receiving cover, thereby allowing the rear fin to move freely.

Further, wherein the present invention is utilized with an externally mounted store further comprising a front portion for receiving a removable nosetip, the present invention is further provided with a nosecone. Externally mounted stores, such as projectile weapons or bombs, often are provided with removable nosetips which are adapted to receive a wrench to facilitate removal, where the nosetip is threadily engaged. The adaption of the nosetip for wrenching results in sharp angles and flat surfaces, with associated radar observability. Thus, it is contemplated that such a nosetip would be replaced with the nosecone. The nosecone is further provided with a radar reflective material. The radar reflective material facilitates reflection of radar signals in a desired direction (i.e., away from the radar detecting sensor which is usually located concurrent with the radar signal source). The nosecone is formed to engage the front portion of the externally mounted store. In addition, the nosecone is defined by a tip. Additionally, the body covering of the present invention is provided with a front opening formed in the body covering being. The front opening is sized to received at least a portion of the nosecone therethrough to allow the nosecone to engage with the front portion. Thus, at the front portion of the externally mounted store, the body covering is disposed between the front portion and the nosecone.

In addition, wherein the store covering of the present invention is utilized with an externally mounted store further comprising a fuselage and at least one aerodynamic control surface affixed to and extending at an angle from the fuselage for aerodynamic performance, the body covering is further provided with at least one control surface receiving slot. Each respective control surface receiving slot is formed in the body covering being sized to receive a respective aerodynamic control surface therethrough. Thus, the deployment of the body covering does not significantly interfere with the operation of any aerodynamic control surface affixed to the fuselage of the externally mounted store.

The present invention addresses the various problems associated with previous radar-cross-section reduction systems by utilizing low cost, close fitting components. It does not require any scheduled maintenance with associated training, as is the case with radar absorption coating designs. If any of the component parts of the present invention are damaged, such parts are simply replaced. Advantageously, the installation and replacement procedures of the present invention are extremely simple and can be accomplished in short order. Furthermore, the present invention does not significantly alter the shape of the externally mounted store because of its close fitting nature, and thereby avoiding costly flight re-certification.

In addition, where the present invention is employed with a store, such as a weapon having movable control fins, the fin receiving covers are adapted to be readily jettisoned so as to not interfere with the operation of the control fins when the weapon is in flight. Further, another feature of the present invention is that, where the present invention is employed with a store having attached aerodynamic control surfaces, such as strakes or wings, the body cover is adapted to not significantly interfere with their operation.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENT

Figure 1:
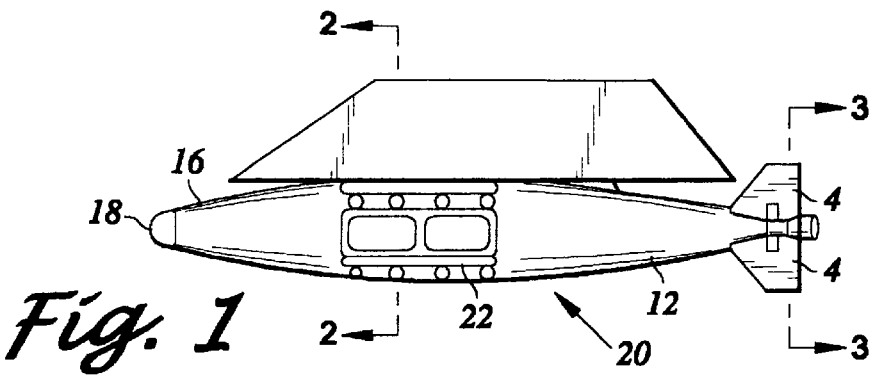
FIG. 1 is a lateral cross-sectional view of an externally mounted store without the application of the present invention.

Referring now to the drawings wherein the showings are for purposes of illustrating a preferred embodiment of the present invention only, and not for purposes of limiting the same, FIGS. 3–6 illustrate a store covering 10 which is constructed in accordance with the present invention. As will be described in more detail below, the store covering 10 is designed to reduce the radar observability of an externally mounted store 12.

Figure 2:
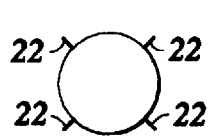
FIG. 2 is a cross-sectional view of the externally mounted store as depicted in FIG. 1, as seen along line 2—2.
Figure 3:
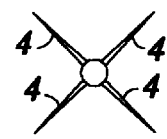
FIG. 3 is a cross-sectional view of the externally mounted store as depicted in FIG. 1, as seen along line 3—3.
Figure 4:
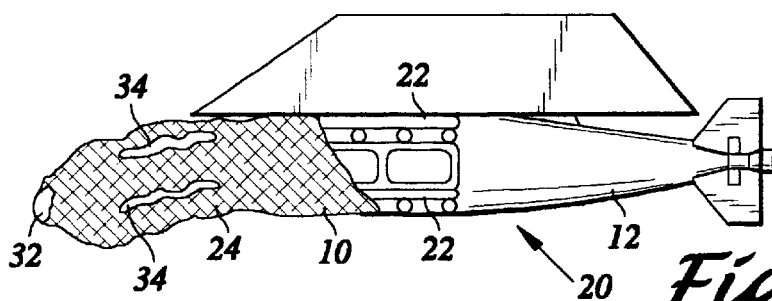
FIG. 4 is a lateral cross-sectional view of an externally mounted store with the body cover of the present invention partially applied to the externally mounted store.
Figure 5:
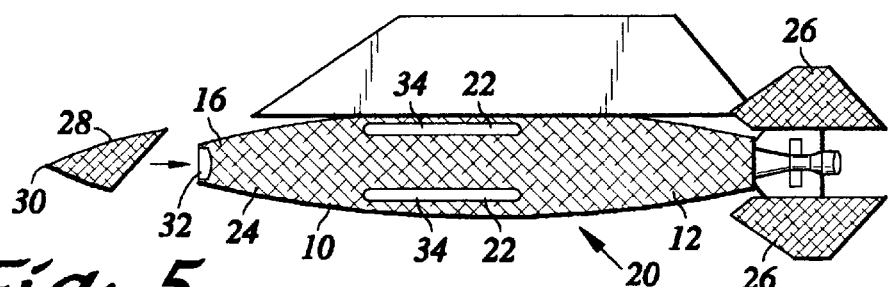
FIG. 5 is a lateral cross-sectional view of an externally mounted store with the present invention partially applied to the externally mounted store.
Figure 6:
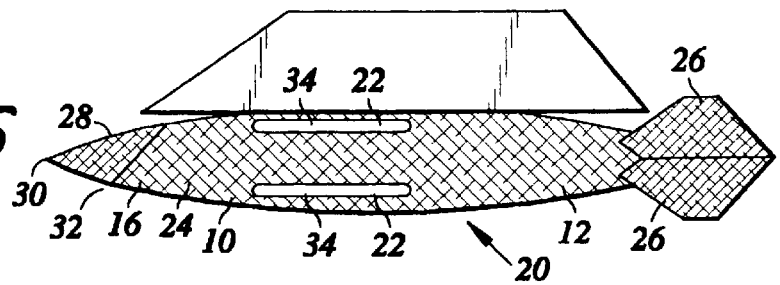
FIG. 6 is a lateral cross-sectional view of an externally mounted store with the present invention.

Referring now to FIGS. 1–3, an externally mounted store 12 is depicted. The preferred embodiment of the present invention is utilized with an externally mounted store 12 provided with at least one rear fin 14 (four depicted), a front portion 16 for receiving a removable nosetip 18, a fuselage 20, and at least one aerodynamic control surface 22 (four strakes depicted) affixed to and extending at an angle from the fuselage 20 for aerodynamic performance. In order to practice the present invention, however, the externally mounted store 12 need not include a rear fin 14, a front portion 16 for receiving a removable nosetip 18, and an aerodynamic control surface 22 as described above and are only shown in FIGS. 1–6 to illustrate the preferred embodiment of the present invention only, and not for limiting the same. The depicted configuration of the externally mounted store 12 is similar to that of a projectile weapon or bomb.

In accordance with the present invention, a store covering 10 for reducing the radar observability of an externally mounted store 12 is provided with a non-rigid body covering 24. The body covering 24 is adapted to fit around a portion of the externally mounted store 12. The body covering 24 is in slidable engagement and disengagement about at least a portion of the externally mounted store 12 to allow repeated installation and removal. The body covering 24 is provided with a radar reflective material. The radar reflective material facilitates reflection of radar signals in a desired direction (i.e., away from the radar detecting sensor which is usually located concurrent with the radar signal source).

It is contemplated that the body covering 24 may take the form of a large sleeve or sock. In such a case, the body covering 24 would be pulled over one of the ends of the externally mounted store 12 and then around the externally mounted store 12. It is also contemplated that the body covering 24 may take the form of a large sheet of material. In such a case, the body covering 24 would be draped around the externally mounted store 12.

Although the body covering 24 is removable, after it is deployed or installed on the externally mounted store 12, it does not necessarily need to be removed. It is contemplated that the removability feature facilitates easy removal when for example the body covering 24 is damaged. In such a case, the body covering 24 is simply removed and replaced.

In the preferred embodiment, the body covering 24 is provided with a fabric material. Fabric material includes, but is not limited to, those materials which are woven and matted, such as polyester taffeta, for example. Although preferred, a fabric material need not be utilized to practice the present invention. Other materials, such as neoprene, for example, could form the body covering 24. Further, the fabric material may be embedded with a conductive material and thereby achieve desired radar reflectiveness. The radar reflectiveness may be indirectly measured by the conductivity of the body covering 24 because the radar reflectiveness increases with a corresponding increase of material conductivity. For example, a suitable conductive material may be a Nickel-Copper material. It is preferred that the conductivity of the body covering 24 be less than 2 Ohms per square inch of surface area. It is contemplated that the methods of embedding the fabric material with the conductive material include, but are not limited to, electric plating and spray on techniques. Further still, the body covering 24 may be embedded with a metallic material. For example, a suitable metallic material may be a Nickel-Copper material. Although metallic materials are preferred, non-metallic materials such as Carbon having a desired conductivity may be utilized. Additionally, the fabric material may itself be formed of a conductive material. For example, Silver strands may be woven to form a portion of the fabric. Further still, the fabric material itself may comprise a metallic material.

It is preferred that the body covering 24 is formed to closely fit to the externally mounted store. It is contemplated that at least one fastener (not shown) is in contact with the body covering 24 and when the fastener is secured, at least a portion of the body covering is held in close contact with the externally mounted store 12. It is contemplated that fasteners may include, but are not limited to, straps, Velcro, zippers, buttons and hooks. It is contemplated that other manners of adapting the body covering 24 to fit closely are well known to those of ordinary skill in the art.

In the preferred embodiment, the store covering 10 of the present invention is utilized with an externally mounted store 12 having at least one rear fin 14. The store covering 10 is further provided with at least one fin receiving cover 26. Each fin receiving cover 26 is provided with a radar reflective material. The radar reflective material facilitates reflection of radar signals in a desired direction (i.e., away from the radar detecting sensor which is usually located concurrent with the radar signal source). Each respective fin receiving cover 26 is formed to substantially conform to the shape of at least a portion of a respective rear fin 14 for receiving the respective rear fin 14.

Furthermore, where the rear fin 14 of the externally mounted store 12 is adapted to move for aerodynamic control, each respective fin receiving cover 26 is detachable from a respective rear fin 14 in response to rear fin 14 movement. Thus, it is contemplated that the rear fin receiving cover 26 would mitigate radar observability prior to and while the externally mounted store is launched. Subsequent to launching, when the rear fin 14 may move for aerodynamic control during flight, movement would initiate the detachment or jettisoning of the fin receiving cover 26, thereby allowing the rear fin 14 to move freely. It is contemplated that other methods of initiating detachment may be employed as chosen from those well known to one of ordinary skill in the art. It is further contemplated that the detachment may occur prior to launch.

Further in the preferred embodiment, wherein the present invention is utilized with an externally mounted store 12 further comprising a front portion 16 for receiving a removable nosetip 18, the present invention is further provided with a nosecone 28. Externally mounted stores, such as projectile weapons or bombs, are often provided with removable nosetips which are adapted to receive a wrench to facilitate removal, where the nosetip is threadily engaged. The adaption of the nosetip for wrenching results in sharp angles and flat surfaces, with associated radar observability. Thus, it is contemplated that such a nosetip, as depicted as nosetip 18, would be replaced with the nosecone 28. The nosecone 28 is provided with a radar reflective material. The radar reflective material facilitates reflection of radar signals in a desired direction (i.e., away from the radar detecting sensor which is usually located concurrent with the radar signal source). The nosecone 28 is formed to engage the front portion 16 of the externally mounted store. It is contemplated that the manner of forming the nosecone 28 to engage the front portion 16 is chosen from those well known to one of ordinary skill in the art. In addition, the nosecone 28 is defined by a tip 30.

Additionally, the body covering 24 of the present invention is preferably provided with a front opening 32 formed in the body covering 24 being sized to receive the nosecone 28 therethrough to allow the nosecone 28 to engage with the front portion 16. Thus, at the front portion 16 of the externally mounted store 12, the body covering 24 is disposed between the front portion 16 and the nosecone 28.

In addition, wherein the store covering 10 of the present invention is utilized with an externally mounted store 12 which is further provided with a fuselage 20 and at least one aerodynamic control surface 22 affixed to and extending radially outward from the fuselage 20 for aerodynamic performance, the body covering 24 is further provided with at least one control surface receiving slot 34 formed in the body covering 24. Each respective control surface receiving slot 34 is sized to receive a respective aerodynamic control surface 22 therethrough. Thus, the deployment of the body covering 24 does not interfere with the operation of any aerodynamic control surface 22 affixed to the fuselage 20 of the externally mounted store 12.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. A store covering comprising a front portion for receiving a removable nosetip for reducing the radar observability of an externally mounted store, the store covering comprising:

a nosecone comprising a radar reflective material and formed to engage the front portion; and a non-rigid body covering having a front opening formed in the body covering being sized to receive at least a portion of the nosecone therethrough to allow the nosecone to engage with the front portion, the body covering being formed of a radar reflective material, formed to substantially conform to the shape of at least a portion of the externally mounted store, and being in slidable engagement and disengagement about at least a portion of the externally mounted store to allow repeated installation and removal.

2. The store covering of claim 1, wherein at least a portion of the body covering being conductive.

3. The store covering of claim 1, wherein at least a portion of the body covering having a conductivity of less than 2 Ohms per square inch.

4. The store covering of claim 1, wherein the body covering comprises a fabric material.

5. The store covering of claim 4, wherein at least a portion of the fabric material is embedded with a conductive material.

6. The store covering of claim 5, wherein the fabric material which is embedded with a conductive material having a conductivity of less than 2 Ohms per square inch.

7. The store covering of claim 6, wherein the fabric material is embedded with a metallic material.

8. The store covering of claim 4, wherein at least a portion of the fabric material is a conductive material.

9. The store covering of claim 8, wherein the fabric material which is a conductive material having a conductivity of less than 2 Ohms per square inch.

10. The store covering of claim 9, wherein the fabric material which is a conductive material is a metallic material.

11. The store covering of claim 1, wherein the body covering being formed to closely fit to the externally mounted store.

12. The store covering of claim 11, wherein the store covering further comprising:

at least one fastener in contact with the body covering and when secured, at least a portion of the body covering is held in close contact with the externally mounted store.

13. The store covering of claim 1, wherein the externally mounted store having at least one rear fin, further comprising:

at least one fin receiving cover comprising a radar reflective material and formed to substantially conform to the shape of at least a portion of a respective rear fin for receiving the respective rear fin.

14. The store covering of claim 13, wherein the respective rear fin being adapted to move for aerodynamic control, wherein the respective fin receiving cover being detachable from the respective rear fin in response to respective rear fin movement.

15. The store covering of claim 1, wherein the nosecone being defined by a tip.

16. The store covering of claim 1, wherein the externally mounted store further comprising a fuselage and at least one aerodynamic control surface affixed to and extending at an angle from the fuselage for aerodynamic performance, wherein the body covering further comprising:

a least one control surface receiving slot formed in the body covering being sized to receive a respective aerodynamic control surface therethrough.

17. A store covering, for reducing the radar observability of an externally mounted store comprising at least one rear fin and a fuselage comprising a front portion for receiving a removable nosetip, comprising:

at least one fin receiving cover comprising a radar reflective material and formed to substantially conform to the shape of at least a portion of a respective rear fin for receiving the respective rear fin;

a nosecone comprising radar reflective material and formed to engage the front portion of the externally mounted store; and a non-rigid body covering comprising a radar reflective material, formed to fit around a portion of the externally mounted store, being in slidable engagement and disengagement about the externally mounted store to allow repeated installation and removal, and further comprising a front opening formed in the body covering being sized to receive at least a portion of the nosecone therethrough to allow the nosecone to engage with the front portion.

18. A store covering for reducing the radar observability of an externally mounted store comprising a fuselage and at least one aerodynamic control surface affixed to and extending at an angle from the fuselage for aerodynamic performance, the store covering comprising:

a non-rigid body covering having a least one control surface receiving slot formed in the body covering being sized to receive a respective aerodynamic control surface therethrough comprising a radar reflective material, the body covering being formed to substantially conform to the shape of at least a portion of the externally mounted store, and being in slidable engagement and disengagement about at least a portion of the externally mounted store to allow repeated installation and removal.

19. The store covering of claim 18, wherein at least a portion of the body covering being conductive.

20. The store covering of claim 18, wherein at least a portion of the body covering having a conductivity of less than 2 Ohms per square inch.

21. The store covering of claim 18, wherein the body covering comprises a fabric material.

22. The store covering of claim 21, wherein at least a portion of the fabric material is embedded with a conductive material.

23. The store covering of claim 22, wherein the fabric material which is embedded with a conductive material having a conductivity of less than 2 Ohms per square inch.

24. The store covering of claim 23, wherein the fabric material is embedded with a metallic material.

25. The store covering of claim 21, wherein at least a portion of the fabric material is a conductive material.

26. The store covering of claim 25, wherein the fabric material which is a conductive material having a conductivity of less than 2 Ohms per square inch.

27. The store covering of claim 26, wherein the fabric material which is a conductive material is a metallic material.

28. The store covering of claim 18, wherein the body covering being formed to closely fit to the externally mounted store.

29. The store covering of claim 28, wherein the store covering further comprising:
   at least one fastener in contact with the body covering and when secured, at least a portion of the body covering is held in close contact with the externally mounted store.

30. The store covering of claim 18, wherein the externally mounted store having at least one rear fin, further comprising:
   at least one fin receiving cover comprising a radar reflective material and formed to substantially conform to the shape of at least a portion of a respective rear fin for receiving the respective rear fin.

31. The store covering of claim 30, wherein the respective rear fin being adapted to move for aerodynamic control, wherein the respective fin receiving cover being detachable from the respective rear fin in response to respective rear fin movement.

32. The store covering of claim 18, wherein the externally mounted store further comprising a front portion for receiving a removable nosetip, further comprising:
   a nosecone comprising a radar reflective material and formed to engage the front portion.

33. The store covering of claim 32, wherein the nosecone being defined by a tip.

34. The store covering of claim 32, wherein the body covering further comprising a front opening formed in the body covering being sized to receive at least a portion of the nosecone therethrough to allow the nosecone to engage with the front portion.

* * * * *